United States Patent Office 2,972,893
Patented Feb. 28, 1961

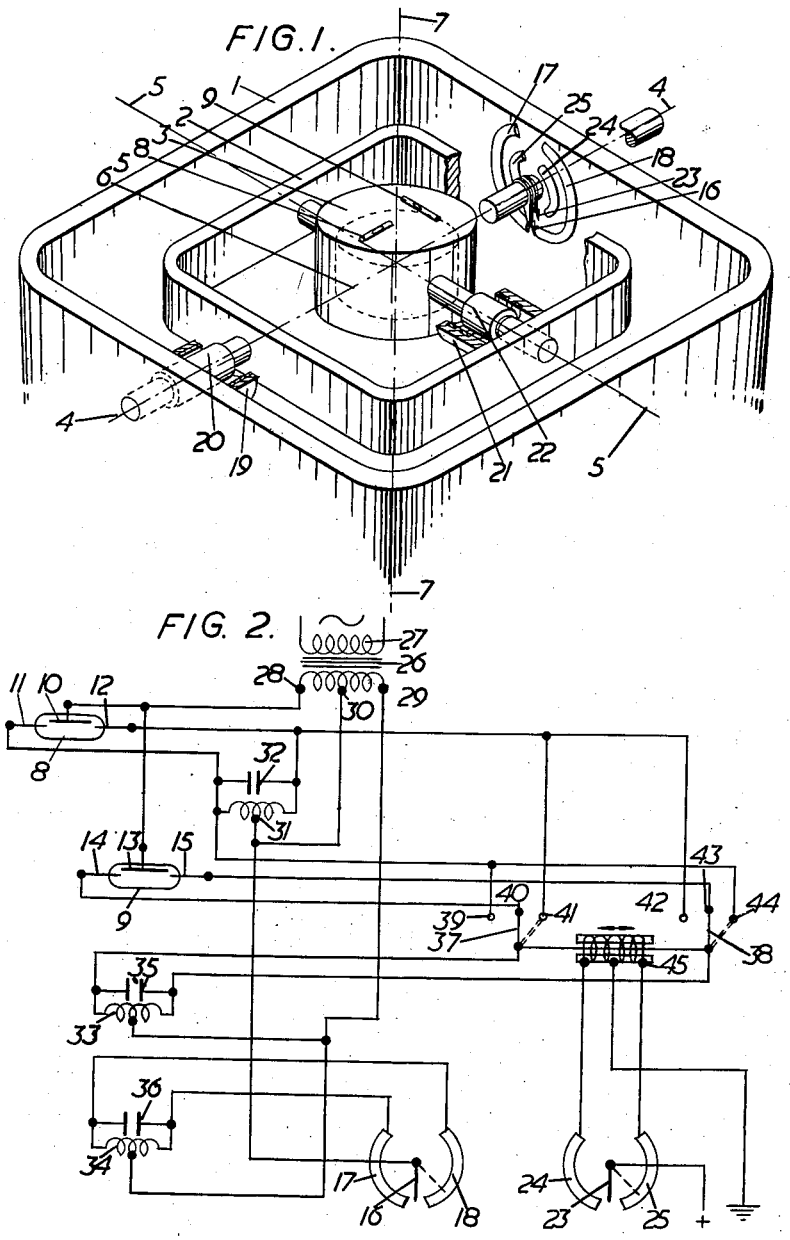

2,972,893
GYRO VERTICALS

Alastair Michael Adair Majendie, Cookham Dean, and Heinz Pollak, Cheltenham, England, assignors to Smiths America Corporation, Washington, D.C.

Filed Feb. 3, 1958, Ser. No. 712,737

Claims priority, application Great Britain Feb. 1, 1957

8 Claims. (Cl. 74—5.47)

The present invention relates to gyro verticals such as are used on moving craft, in particular on aircraft, having a spin axis (normally substantially vertical) and two precessional degrees of freedom, about the pitch and roll axes of the craft respectively.

In instruments of this kind torque generating means are provided to exert precessing torques about the roll and pitch axes, and precess the gyroscope about the pitch and roll axes (the pitch and roll erection torques respectively) which operate conventionally under the control of gravity-responsive devices in straight and level flight to erect the spin axis into a datum position in relation to, usually of coincidence with, the direction of gravity. It has been proposed in such an instrument to energise the roll erection torque generating means during turning flight in accordance with deviation of the spin axis from the vertical in the pitch direction, making use of the fact that a pitch error at any instant would give rise to a bank error 90° later in the turn, this mode of energisation being sometimes called "pitch-bank erection." Various criteria have been proposed to determine when the change between normal and pitch-bank erection should take place, for example lateral acceleration of the craft (as determined by, e.g., a mercury switch) angle of bank (as determined by displacement of the spin axis in roll in relation to the instrument case) or rate of yaw as determined, e.g. by a spring-restrained gyroscope) which suffer from various disadvantages, and a further arrangement for the determination of the change is disclosed in the specification of co-pending U.S. application No. 663,292, and now Patent No. 2,906,127, assigned to the assignees of the present application. This latter arrangement although operationally satisfactory entails the use of information from a heading responsive system which is not always conveniently available.

The disadvantage of using either lateral acceleration or measured angle of bank as the criterion to determine the change between normal and pitch bank erection is the risk that certain flight manoeuvres may result in the aircraft returning to level unbanked flight with a residual bank error in the alignment of the spin axis of the gyro, sufficient to introduce or retain pitch bank erection in sensibly straight flight. Under these conditions positive control of the gyro in roll has been lost, and substantial errors may result and persist.

The disadvantage of using rate of yaw as the criterion is the risk that under turbulent conditions of sensibly straight and level flight pitch bank erection in either one sense or the other may be applied almost continuously and the time for which normal erection is provided may be insufficient to retain positive control of the gyro in roll.

It is accordingly the object of the present invention to provide a gyro vertical having pitch-bank erection and in which comparatively simple criteria may be used to determine the change between pitch-bank and normal erection with risk of loss of control over its position.

According to the present invention, in a gyro vertical having provision for pitch bank erection means are provided to generate a component of roll erection torque in accordance with deviation of the spin axis in roll from a reference fixed in the craft, and parallel to the normal axis thereof, which said component is always smaller in magnitude than any component of roll erection torque generated in accordance with the deviation between the spin axis and gravity in the roll or pitch direction as the case may be.

A gyro vertical suitable for aircraft and constructed in accordance with the invention will now be described with reference to the accompanying drawings of which—

Figure 1 is a partly cut-away perspective view of the gyro vertical and

Figure 2 is a diagram of an associated control circuit.

Referring to Figure 1 the gyro vertical is housed in a conventional case 1, normally fixed in the aircraft, and has an outer gimbal ring 2 journalled in the case for rotation in roll, in which is in its turn gimballed a rotor casing 3 for rotation in pitch. The roll axis is indicated at 4 and the pitch axis at 5. The rotor casing carries internally a conventional electrically driven rotor indicated at 6 having its spin axis 7 normally vertical and externally two mercury switches 8 and 9 responsive to tilt in the pitch and roll directions respectively. Mercury switch 8 has a central electrode 10 and two end electrodes 11, 12 (Figure 2) so that connection is established between the central electrode and one or other of the end electrodes, which depending on the direction of tilt, when the direction of the spin axis deviates in pitch from the direction of apparent gravity by more than some predetermined amount. Similarly mercury switch 9 has a central electrode 13 and two end electrodes 14, 15 so that connection is established between the central electrode and one or other of the end electrodes which depending on the direction of tilt, when the direction of the spin axis deviates in roll from the direction of apparent gravity by more than some predetermined amount. A first two part pick-off is provided with a wiper arm 16 attached to outer gimbal ring 2 and two fixed contacts 17, 18 secured to case 1. Similarly a second two part pick-off is provided with a wiper arm 23 attached to outer gimbal ring 2 and two fixed contacts 24, 25 secured to case 1. It is arranged that the wiper arms of the two pick-offs engage one or other of their associated fixed contacts when the rotor casing deviates in roll from its normal (spin axis vertical) position in relation to the case for straight and level flight, the ends of contacts 17 and 18 being closer together, as is shown in Figure 1, than those of contacts 24 and 25 so that a smaller angular movement is required for contact to occur in the first two part pick-off than in the second one.

A pitch erection torque motor has its stator 19 fixed to the case and its rotor 20 attached to outer gimbal right 2 so that it may apply a torque about the roll axis (and thus erect the spin axis in pitch). A roll erection torque motor has its stator 21 fixed to outer gimbal ring 2 and its rotor 22 attached to rotor casing 3 so that it may apply a torque about the pitch axis (and thus erect the spin axis in roll).

Referring to Figure 2 a transformer 26 has a primary coil 27 which is connected to an A.C. power supply and a secondary coil with end terminals 28, 29, and a centre tap 30. The pitch erection torque motor has a single centre-tapped control winding (indicated at 31) the outer terminals being connected respectively to electrodes 11 and 12 of mercury switch 8 and the centre tap being connected to the centre tap 30 of transformer 26. A capacitor 32 is wired in parallel with winding 31. The central electrode 10 of mercury switch 8 is connected to terminal 28 of transformer 26. The roll erection torque motor has two centre-tapped control windings (indicated at 33 and 34 respectively) the centre taps being connected to terminal 29 of transformer 26. Capacitors 35 and 36 are respectively wired in parallel with control windings 33 and 34. The outer terminals of control winding 34 are connected respectively to contacts 17 and 18 of the first pick-off, wiper arm 16 being connected to centre tap 30 of transformer 26. A three-way two pole switch having moving contacts 37, 38 co-operating respectively with fixed contacts 39, 40, 41 and 42, 43, 44 is operated by a solenoid having a centre-tapped coil 45. The centre tap is connected to the negative terminal of a D.C. power supply (not shown) and the outer terminals are connected respectively to fixed contacts 24 and 25 of the second pick-off the wiper arm of which is connected to the positive terminal of the D.C. power supply.

The mercury switches 8 and 9 are connected to the fixed contacts of the three-way switch as follows:

Electrode 12 is connected to contacts 41 and 42, electrode 11 is connected to contacts 39 and 44, and electrodes 14 and 15 are connected to contacts 40 and 43 respectively.

Moving contacts 37 and 38 are connected respectively to the outer terminals of control winding 33. It is arranged that when wiper arm 23 of the second pick-off engages contact 24 the moving contact 37 engages contact 39 and moving contact 38 engages contact 42. When wiper arm 23 engages contact 25, contacts 37 and 38 engage contacts 41 and 44 respectively and when wiper arm 23 engages neither contact 24 nor contact 25 then contacts 37 and 38 engage contacts 40 and 43 respectively.

Any other means responsive to a substantial turning motion of the aircraft such as a suitably mounted mercury switch or a conventional spring-restrained gyroscope may be used in place of the second two-part pick-off 23 etc. to control the three way switch.

The working of the gyro vertical is as follows:

When the spin axis deviates in pitch from the vertical control winding 31 of the pitch erection torque motor is energised in the appropriate sense through mercury switch 8 to apply a torque about the roll axis (and thus to erect the spin axis in pitch). The motor is conveniently such that upon energisation it produces precession of the spin axis in the pitch direction at a rate of about 2½° per minute. When the aircraft is flying straight wiper arm 23 does not engage contacts 24 or 25 and consequently the three-way switch 37, 38 etc. is in its centre position and control winding 33 of the roll erection torque motor is energised in the appropriate sense through mercury switch 9, when the spin axis deviates in roll from the vertical, to apply a torque about the pitch axis (and thus to erect the spin axis in roll). The torque generated by the motor upon energisation of winding 33 (alone) produces precession of the spin axis in the roll direction at the rate of about 5° per minute. It will be appreciated that to this end the mercury switch 9 must be arranged to operate and energize the winding 33 at angular deviations of the spin axis which are smaller than those required to cause contact in the second two-part pick-off. When the second pick-off 23 etc. (the turn responsive means) is actuated as a result of turning flight the three way switch 37, 38 etc. is operated to energise the control winding 33 of the roll erection torque motor in the appropriate sense through the pitch responsive mercury switch 8 i.e. pitch bank erection is provided. Control winding 34 of the roll erection torque motor is energised through the first pick-off 16 etc. when the spin axis deviates in roll from its normal position in the case for straight and level flight by an amount less than that necessary to cause operation of the second pick-off, to produce precession of the spin axis in the roll direction at a rate of about 2½° per minute (when winding 34 alone is energised) in a sense to align the spin axis in its normal position.

The component of roll erection torque determined by the first two part pick-off 16 etc. in true turning flight will be nullified by the larger magnitude component controlled by the pitch-responsive mercury switch 8, and in straight flight non-turbulent conditions its effect will be swamped by the larger magnitude component controlled by the roll-responsive mercury switch 9, but it would in any case in general operate to erect the spin axis towards a position of alignment with the vertical in roll (when the aircraft is level in roll), and so assist the erection operation. In straight flight turbulent conditions or in weaving flight, however, the simple turn responsive means 23 etc. will oscillate and tend to maintain pitch bank erection in operation for the greater part of the time, and thus may prevent the roll responsive switch 9 from exerting sufficient control over the roll erection to ensure proper alignment with gravity. However, the component of roll erection torque developed under the control of the first two part pick-off 16 etc. will operate to erect the spin axis to a position of alignment with the mean roll attitude of the aircraft, which will be approximately level, so that the spin axis will continue to be properly erected in roll, and only subject to the risk of a minor error caused by any out of trim of the aircraft. In any event it is important that roll-responsive mercury switch 9 operates to give normal roll erection before the spin axis can deviate in roll far enough to bring either of the wiper arms 16 or 23 into contact with their associated fixed contacts; otherwise, the three-way switches controlled by the coil 45 will bring pitchbank erection into operation if the spin axis deviates in roll during straight and level flight. This is, of course, not desirable.

If measured bank or lateral acceleration is used as the criterion to determine the change between normal and pitch bank erection, and if the aircraft executes such manoeuvres that it returns to level unbanked flight with a residual bank error in the alignment of the spin axis of the gyro in roll sufficient to introduce or retain pitch bank erection in what is now sensibly straight flight, normal gravity erection will remove any misalignment in pitch, so that, thereafter, the component of roll erection torque developed under the control of the first two part pick-off will provide an overriding control to erect the spin axis to a position of alignment with the mean roll attitude of the aircraft. By this means the residual bank error is reduced until a point is reached at which the false criterion for pitch bank erection is removed, and normal gravity control in roll is re-applied.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A gyro vertical for use in a mobile craft and having a spin axis, two precessional degrees of freedom about pitch and roll axis respectively and provision for pitch bank erection and further comprising in combination means for detecting deviation of the spin axis in roll from a reference fixed in the craft, and parallel to the normal position of the spin axis when it is erect during straight and level motion of the craft and means controlled by said detecting means on occurrence of such deviation to generate a component of roll erection torque which is always smaller in magnitude than any component of roll erection torque generated in accordance with deviation between the spin axis and gravity in the roll or pitch direction as the case may be.

2. A gyro vertical as claimed in claim 1 wherein the said means comprise a roll erection torque motor and electric contacts, the electric contacts being arranged to control energisation of the motor and being actuated in accordance with deviation of the spin axis in roll from said reference.

3. A gyro vertical as claimed in claim 2 wherein the said motor has two control windings one being energised under the control of the said electric contacts and the other being energised under the control of a gravity responsive device to provide the normal roll erection torque.

4. A gyro vertical as claimed in claim 3, said electric contacts for said motor comprising two two-part pick-offs each having a wiper arm and two fixed contact segments, each said segment pair being connected across one of said control windings for said motor.

5. In gyro-vertical apparatus for use in a mobile craft, the apparatus being mounted in a casing fixed relative to the craft and having a spin axis and two precessional degrees of freedom about pitch and bank axes respectively, pitch and bank erection means, first and second gravity sensitive devices responsive to deviation of the spin axis in pitch and bank respectively from the direction of apparent gravity to cause energization of the appropriate one of said erection means to reduce such deviation and turn sensitive switching means for securing pitch-bank erection by causing energization of the bank erection means under the control of the first gravity sensitive device when the craft assumes a banked condition during a turn, the provision of further switching means responsive to deviation of the spin axis in bank from its normal position relative to the casing (i.e. its relative position when it is erect during straight and level motion of the craft) and means for independently energizing the bank erection means under the control of said further switching means when such deviation occurs, to cause erection of the spin axis in bank at a rate less than that caused by energization of the bank erection means under the control of either of the gravity sensitive devices.

6. Gyro-vertical apparatus comprising a rotor casing, a gyroscope rotor mounted for rotation within the rotor casing about a spin axis, a first gimbal ring and means supporting the rotor casing relative to the first gimbal ring for rotation about a pitch axis normal to the spin axis of the rotor, a second gimbal ring fixed relative to the craft and means supporting the first gimbal ring within the second gimbal ring for rotation about a bank axis normal to both the pitch axis and the spin axis when the rotor is in its normal position in pitch, first and second gravity sensitive devices mounted on the rotor casing to detect deviation of the spin axis from the apparent vertical in pitch and bank respectively, pitch erection means for exerting a torque between the first and second gimbal rings about the bank axis to cause precession of the spin axis about the pitch axis, bank erection means for exerting a torque between the rotor casing and the first gimbal ring about the pitch axis to cause precession of the spin axis about the bank axis, means for energizing the pitch erection means under the control of the first gravity sensitive device to maintain the spin axis substantially erect in pitch, first and second electrical contactors each having a moving contact member mounted for rotation about the bank axis with the first gimbal ring relative to the second gimbal ring and contact members fixed on the second gimbal ring and arranged to be contacted by the moving contact member on deviation of the spin axis in bank from its normal position relative to the second gimbal ring (i.e. its position relative to the second gimbal ring when erect during straight and level motion of the craft), switching means controlled by the first contactor which switching means, when there is no contact between the contact members of the first contactor, connects the second gravity sensitive device to control energization of the bank erection means but, when contact is made in the first contactor, connects the first gravity sensitive device to control energization of the bank erection means thereby securing pitch-bank erection and the second contactor operating, when there is contact between its contact members, to cause energization of the bank erection means to erect the spin axis in bank at a rate less than that at which it is erected in bank under the control of the first and second gravity sensitive devices.

7. Gyro-vertical apparatus according to claim 6 in which the bank erection means comprises an electric motor having first and second control windings, first energizing means for energizing the first control winding to cause the motor to exert a torque sufficient to erect the spin axis in bank at a first rate and second energizing means for energizing the second control winding to cause the motor to exert a torque sufficient to erect the spin axis in bank at a second rate which is less than said first one, the first winding being energized by the first energizing means when appropriate under the control of the gravity sensitive devices and the first electrical contactor and the second winding being energized by the second energizing means when appropriate under the control of the second electrical contactor.

8. Gyro-vertical apparatus according to claim 7, so constructed and arranged that said first rate is double the second one.

References Cited in the file of this patent

UNITED STATES PATENTS

| | | |
|---|---|---|
| 2,369,131 | Branddon et al. | Feb. 13, 1945 |
| 2,542,975 | Adkins | Feb. 27, 1951 |
| 2,633,029 | Lajeunesse | Mar. 31, 1953 |
| 2,643,547 | Konet | June 30, 1953 |
| 2,667,705 | Glenney et al. | Feb. 2, 1954 |
| 2,763,157 | Summers | Sept. 18, 1956 |
| 2,821,087 | Hammon | Jan. 28, 1958 |
| 2,880,617 | Cotton | Apr. 7, 1959 |